United States Patent
Wallace

(10) Patent No.: US 11,570,737 B1
(45) Date of Patent: Jan. 31, 2023

(54) DEVICED BASED NETWORK STEERING

(71) Applicant: AT&T Intellectual Property I, L.P., Atlanta, GA (US)

(72) Inventor: Todd Wallace, Hamilton, MT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/402,023

(22) Filed: Aug. 13, 2021

(51) Int. Cl.
*H04W 60/00* (2009.01)
*H04W 28/02* (2009.01)

(52) U.S. Cl.
CPC ........ *H04W 60/00* (2013.01); *H04W 28/0252* (2013.01)

(58) Field of Classification Search
CPC .................. H04W 60/00; H04W 28/0252
USPC .... 455/435.1, 435.2, 432.1, 422.1, 442, 436
See application file for complete search history.

(56) References Cited

U.S. PATENT DOCUMENTS

| | | | | |
|---|---|---|---|---|
| 9,220,027 | B1* | 12/2015 | Raleigh ................. | H04W 24/02 |
| 2012/0264437 | A1* | 10/2012 | Mukherjee .......... | H04L 65/1069 |
| | | | | 455/445 |
| 2013/0208696 | A1* | 8/2013 | Garcia Martin ...... | H04W 36/32 |
| | | | | 370/331 |
| 2015/0098321 | A1* | 4/2015 | Jeong .................... | H04W 76/50 |
| | | | | 370/329 |
| 2015/0271838 | A1* | 9/2015 | Szilagyi ................ | H04W 76/10 |
| | | | | 370/336 |

* cited by examiner

*Primary Examiner* — Nghi H Ly
(74) *Attorney, Agent, or Firm* — Guntin & Gust, PLC; John G. Rauch

(57) ABSTRACT

Aspects of the subject disclosure may include, for example, attaching a mobile device to an initial bearer at a base station of a mobility network, monitoring a performance parameter for communication by the mobile device on the initial bearer, requesting, by the mobile device, information about other bearers at the base station of the mobility network, wherein the requesting is responsive to the performance parameter failing to exceed a predetermined performance threshold, receiving at the mobile device, network information about other bearers at the base station of the mobility network, the network information including current capacity information for the other bearers, selecting, by the mobile device, a selected alternative bearer based on the information about other bearers, and communicating, to the mobility network, a user equipment (UE) capabilities message identifying the selected alternative bearer and omitting the initial bearer to change bearers to obtain better communication performance at the mobile device. Other embodiments are disclosed.

20 Claims, 7 Drawing Sheets

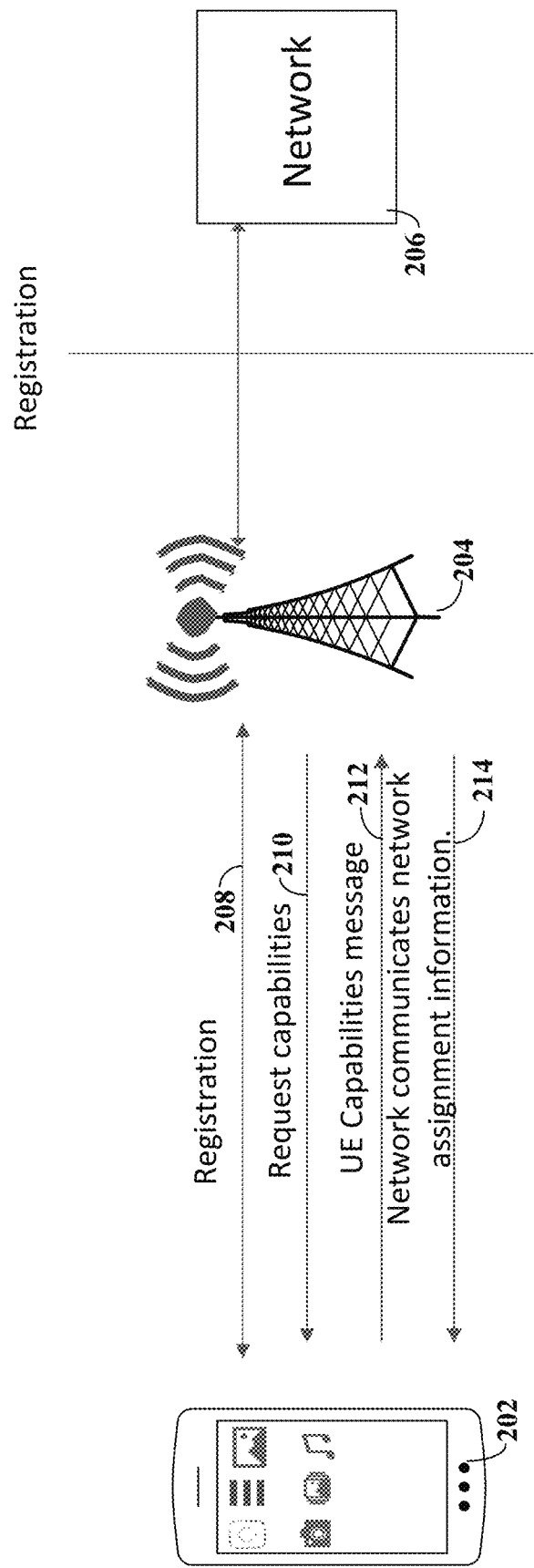

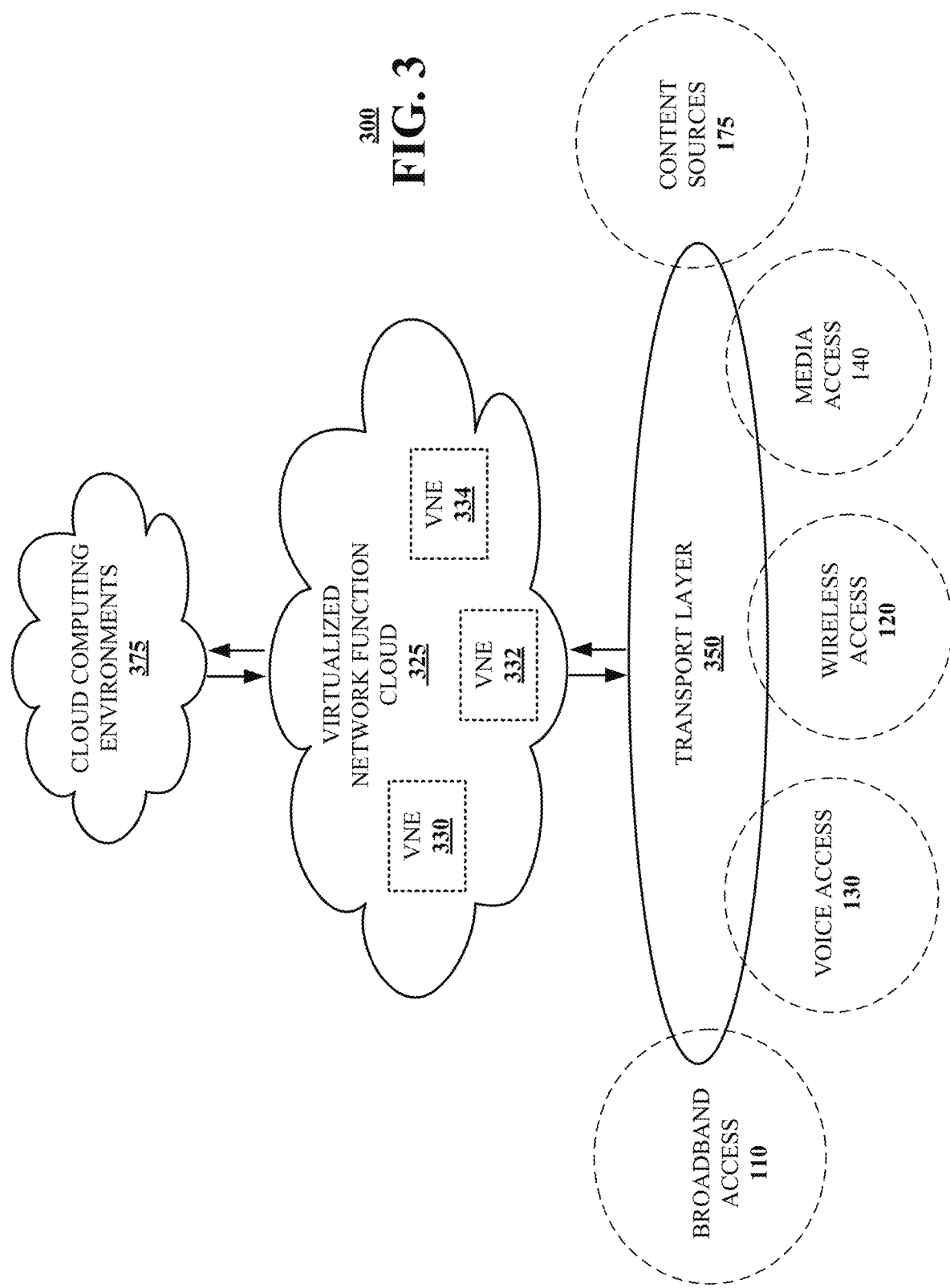

DEVICED BASED NETWORK STEERING

FIELD OF THE DISCLOSURE

The subject disclosure relates to a system and method for device-based network steering in a mobile communication network.

BACKGROUND

Mobile devices register to access a mobility network. In a multi-bearer radio network, the mobility network assigns the mobile devices to an optimal bearer for mobile device based on mobile device capabilities, traffic conditions and other factors.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
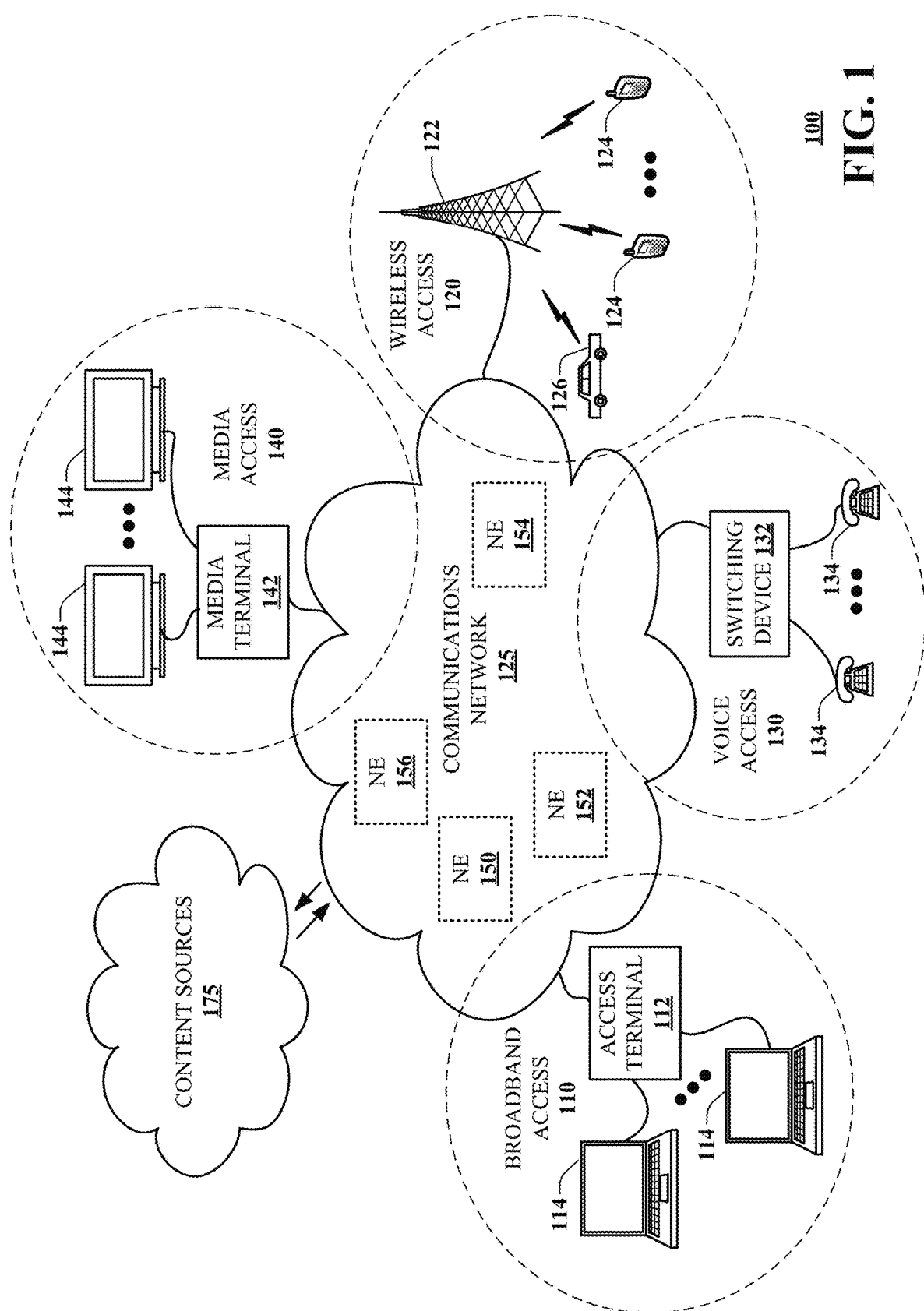
FIG. 1 is a block diagram illustrating an exemplary, non-limiting embodiment of a communications network in accordance with various aspects described herein.

The subject disclosure describes, among other things, illustrative embodiments for device-based network steering in a mobile communication system. Currently, one of the limitations that exists in conventional mobile communication systems is that a mobile network device (user equipment or UE device) and the mobility network each have imperfect information. The UE device has knowledge of the network conditions that the UE device is facing and the environment that it is in, and the mobility network has separate knowledge of the condition of the network. Network conditions include information about available radio networks or traffic bearers in a geographic area, relative traffic levels on each network and predicted traffic levels in the future. Current standards controlling such networks do not have a method for exchanging this information so that each element, the network and the mobile device, has access to better information in which to make decisions. A system and a method in accordance with some aspects herein bridge this gap and provide more information to the UE device so that the UE device is capable of making more informed decisions and giving the user of the device a better outcome. Currently, published standards are silent and nothing has been proposed that overcomes the noted limitations. Other embodiments are described in the subject disclosure.

One or more aspects of the subject disclosure include receiving, from a user equipment (UE) device, a registration communication requesting registration by the UE device on a mobility network, communicating to the UE device a network assignment, the network assignment selected based on information of the registration communication and network usage information of the mobility network, the network assignment identifying an initial bearer for attachment by the UE device. Aspects of the subject disclosure further include initiating communication with the UE device on the initial bearer at a base station of the mobility network, receiving from the UE device, a bearer change communication requesting a change of bearer, and communicating to the UE device, usage information for alternative bearers at the base station of the mobility network. Aspects of the subject disclosure further include receiving from the UE device a UE capabilities message identifying a selected alternative bearer, assigning the UE device to the selected alternative bearer, communicating to the UE device a bearer assignment message identifying the selected alternative bearer, and initiating communication with the UE device on the selected alternative bearer at the base station of the mobility network.

One or more aspects of the subject disclosure include attaching a mobile device to an initial bearer at a base station of a mobility network, monitoring a performance parameter for communication by the mobile device on the initial bearer, requesting, by the mobile device, information about other bearers at the base station of the mobility network, wherein the requesting is responsive to the performance parameter failing to exceed a predetermined performance threshold, receiving at the mobile device, network information about other bearers at the base station of the mobility network, the network information including current capacity information for the other bearers, selecting, by the mobile device, a selected alternative bearer based on the information about other bearers, and communicating, to the mobility network, a user equipment (UE) capabilities message identifying the selected alternative bearer and omitting the initial bearer to change bearers to obtain better communication performance at the mobile device.

One or more aspects of the subject disclosure include registering a mobile device with a mobility network at a base station, the base station supporting a plurality of radio access networks of different technologies, receiving information about radio access networks detected by the mobile device, and assigning the mobile device to an initial radio access network, wherein the assigning is based on the information about radio access networks detected by the mobile device and network information about the radio access networks detected by the mobile device. Aspects of the subject disclosure further include receiving from the mobile device a request for information about available traffic capacity on other radio access networks of the radio access networks detected by the mobile device, communicating, to the mobile device, traffic congestion information for the other radio access networks, receiving from the mobile device a request to change to a selected alternative radio access network of the other radio access networks, and initiating communication between the base station and the mobile device on the selected alternative radio access network.

Referring now to FIG. 1, a block diagram is shown illustrating an example, non-limiting embodiment of a system 100 in accordance with various aspects described herein. For example, system 100 can facilitate in whole or in part assigning a mobile device to an initial radio access network based on radio access networks detected by the mobile device and network information about the radio access networks, receiving from the mobile device a request for information about available traffic capacity on other radio access networks, communicating to the mobile device traffic congestion information for the other radio access networks, and receiving from the mobile device a request to change to a selected alternative radio access network of the other radio access networks to obtain better communication performance at the mobile device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. The exemplary embodiment of the mobile communication system 200 includes a mobile device 202, a base station 204 and a network 206. The base station 204 provides radio communication to mobile devices such as mobile device 202 in a geographic area served by the base station 204. The base station 204 is one base station of a plurality of base stations that provide radio communication to a plurality of mobile devices such as mobile device 202. The network 206 controls operation of device in the system 200 including of handoff of radio communication by a mobile device from one base station to another base station.

Communication between the base station 204 and the mobile device is standardized according one or more air interface standards such as third generation cellular (3G), fourth generation cellular (4G or long-term evolution, LTE), fifth generation cellular (5G) and others that may be developed. The base station 204 may hand off communication with the mobile device 202 to other base stations (not shown) to provide mobility for the mobile device 202. Operations such as control of handover and interconnection with other networks such as the internet are controlled by the network 206. Further, network functions such as subscription to particular services, provision of services and billing are handled by the network 206.

In a particular embodiment, the system 200 implements multiple radio networks including a 4G LTE cellular mobility network as well as a fifth generation (5G) cellular mobility network. 5G cellular includes multiple varieties known as, for example, fifth generation cellular (5G) new radio (NR), sub-6 GHz, mmWave technology, referred to as 5G non-stand-alone (NSA) technology 5G cellular also includes a variety known as 5G stand-alone or 5G SA technology. In 5G systems, sub-6 GHz refers to mid- and low-frequency bands under 6 GHz. Also in 5G systems, mmWave refers to higher frequency radio bands ranging from 24 GHz to 40 GHz. Low-frequency bands are under 1 GHz, while mid-bands range from 3.4 GHz to 6 GHz and are not considered mmWave. mmWave 5G networks are ultra-fast, but they are also ultra-short range. The radio equipment, such as an evolved Node B (eNodeB) for a 4G LTE network or a gNB for a 5G network may be collocated at a site of the base station 204 to provide radio communication to overlapping geographic areas.

When a mobile device such as mobile device 202 contacts the network, the mobile device sends a message to the network telling the network what the mobile device's capabilities are and what networks that it is capable to use. This is referred to as a UE capabilities message. The mobile device also sends information to the network about what networks that it is detecting and the signal strength that it sees for each of the frequency bands that it is detecting. The network then uses this information to tell the mobile device which network to attach to and on which frequency bands. The network has knowledge about how busy a cell site or base station is, and which frequency bands are available, and which are currently in use. On the side of the mobile device, the mobile device 202 has knowledge about the quality of the signal that it has been assigned to, and it also has knowledge about what the user is doing, how long that the task actually is, and what kind of throughput and latency the user is experiencing.

Some 5G technologies such as 5G sub-6 and 5G mmWave, require additional mobile device operating power to connect to the mobility network. Generally, mobile devices such as mobile device 202 rely on a depletable battery for operating power and conservation of battery power during operation is important. Connecting to some 5G networks has required more power for establishing a network connection than has traditionally been the case for prior networks such as LTE networks. Some components of the mobile device 202 require substantial energy for operation, especially when the mobile device is connected to mmWave 5G network. This high energy consumption requirement can cause relatively rapid battery depletion and poor performance of the mobile device.

One solution has been to selectively move the mobile device 202 off of the 5G network when benefits of the 5G network are not available or do not outweigh the battery depletion problem. For example, 5G networks may offer data throughput of 330 Mbit/s to 2.3 Gbit/s. If the device determines that the data throughput on a mmWave network does not meet a predetermined criterion, then the device will move to a different bearer or radio network that takes less energy to provide the same throughput. Often, the lower-energy network or bearer will be an LTE network that is collocated with the 5G mmWave network. This is done in an example by communicating from the mobile device 202 a UE capabilities message that indicates the mobile device 202 does not support mmWave technology. This is done in another example by communicating from the mobile device 202 a message indicating that the mobile device 202 does not detect a mmWave network, even if the mobile device 202 actually does detect a mmWave network. In response, the network must respond by moving the mobile device 202 to a bearer that the device supports or detects. This is a way for the mobile device 202 to remain in control of its operating network. Conventionally, for optimal performance, control and efficiency, the network is usually charged with assigning network resources to mobile devices including the mobile device 202. Such tactics allow the mobile device to override the network's decisions for the mobile device 202.

Such tactics are unwelcome to users of mobile devices mobile device 202 and to network operators. The user has acquired a 5G device and would like to experience all the benefits of using a 5G device, including improved data throughput. The mobile device 202 may include a user interface displaying the current active network such as text reading "LTE" or "5G" for the user to know on which network the user's device is active. If the user is expecting to use the 5G network but sees the device is using an LTE network, the user may be dissatisfied. The user may in turn contact the network operator to complain about the service provided by the network with the complaint that 5G service is paid for in the user's subscription plan but only 4G LTE service is being provided by the network. The network operator is focused on customer satisfaction for subscribers such as the user. However, from the network operator's perspective, the mobile device has overridden the network's decisions for the mobile device 202.

The mobile device must implement these tactics with imperfect information about other available networks. In an example, a user and the user's mobile device are active at a sporting event in a stadium. The mobile device accesses a 5G mmWave network for high data rate. However, because of the large crowd at the sporting event, network congestion is relatively high. Therefore, the user's device may not be getting the desired bandwidth and data throughput on the 5G mmWave network. Therefore, the mobile device may elect to move to another bearer network, such as an overlapping LTE network. However, in the stadium, where many other user devices are present and active, the other bearers may be even more congested that the current bearer used by the user device. As a result, because of congestion, the device may be making a decision to save power by moving to an alternate bearer that is even more congested than the current bearer for the mobile device.

The network provider has information about relative congestion of other bearers serving the area where the mobile device is located. The mobile device may find such information useful in deciding to switch to another bearer to improve power consumption while maintaining good data throughput. However, current radio access network technology does not provide functionality to communicate the information about relative congestion of other bearers from the mobility network to the mobile device. The mobile device periodically reports on networks or bearers detected by the mobile device and the relative signal strength detected by the mobile device. The mobile device thus tells the network what coverage the mobile device sees. Thus, the network knows what networks the mobile device can see; the network knows what the device is capable of; and the network knows what kind of coverage the mobile device is in. Based on that, the network can tell the device what to do. However, there is no way for the network to tell the mobile device how congested or useable the other bearers may be. That is normally not an issue. The network normally steers the device to the best network, from the perspective of available network resources.

However, the battery consumption issue or another issue may cause the mobile device to seek to override the network's decision by changing the device's reported capabilities. The mobile device selects its own network at the expense of the network operator. The network operator must rely on the mobile device's reported capabilities because the contents of the UE capabilities message may change due to factors such as mobility of the mobile device or other changes in the environment of the mobile device. Accordingly, the network operator cannot stop the mobile device from tactics such as changing reported UE capabilities to select a different bearer. However, the network operator can improve the information provided to the mobile device so that the mobile device makes a better or more-informed decision.

If the mobile device and the customer are eligible to be on mmWave or 5G, based on a subscription plan, ideally the network would place the mobile device on that network. However, if that is not the best place for the mobile device to be, such as for data throughput reasons or other technical reasons, the network is intelligent enough to move the mobile device to a better network arrangement such as a different bearer. However, though the noted tactics, the mobile device may become involved in decisions about which network to select for the mobile device. If the mobile device is going to participate in the decision-making, then the mobile device needs better information.

In the example of FIG. 2A, when the mobile device 202 accesses the mobile communication system 200, the mobile device 202 and the base station 204 engage in a registration process 208. In a first step, the base station 204 requests the capabilities of the mobile device 202, step 210. The request may be sent in a standard message format, for example. In a second step, the mobile device 202 or user equipment (UE) returns a UE capabilities message 212. The UE capabilities message 212 may be in a standardized format as well. The UE capabilities message 212 includes information about what radio access technologies the mobile device 202 is able to use such as 3G, 4G LTE, and 5G including mmWave, NSA and NA. The capabilities message 212 includes information about frequencies the mobile device 202 is able to use. Such UE capabilities may depend on the particular mobile device 202, its manufacturer, its model number, etc. Such capabilities may be very hardware-dependent, including based on circuitry of the mobile device such as tuner circuits, oscillator circuits, filter circuits and others. The capabilities message 212 or another communication from the mobile device 202 may further include information about what networks or network bearers the mobile device can detect, such as by receiving a broadcast channel from the base station on a 4G LTE network or one of the 5G networks. The capabilities message 212 or another communication from the mobile device 202 may further include information about radio frequency parameters detected by the mobile device such as relative signal strength for broadcast channels for each network bearer of the base station 204.

Subsequently, at step 214, the base station 204 decides what network to assign the mobile device 202 to use for use in communicating with the base station 204. The decision is based in part on the user capabilities and radio frequency information specified by the mobile device in the UE capabilities message 212 and other communications and in part on the radio access technologies supported by the base station 204. The capabilities of the base station 204 may depend on the particular base station 204, its manufacturer, its model number, etc., and on particular circuitry. The decision may also be based on awareness of the base station 204 or the network 206 about relative traffic levels currently existing or predicted to exist in networks supported by the base station 204. The base station 204 cooperates with and communicates with the network 206 in the registration process 208 for the mobile device 202. The base station 204 communicates a network assignment message in step 214 to the mobile device 202 to complete the registration process 208.

In an example, if the mobile device attaches to a 5G mmWave bearer, the mobile device 202 could use up to 20% more power when attached to a 5G mmWave bearer then connected to an LTE bearer. As a result, the mobile device 202 may include a feature to automatically determine if the mobile device should actually use mmWave for an activity. For example, the mobile device may be connected to a mmWave bearer and the user associated with the mobile device 202 may start watching a video on the mobile device, streaming the video file over the mmWave network. The mobile device 202 will start to download the video. The mobile device 202 will then start to measure performance such as, for example, the data throughput in megabytes per second. After about 30 seconds or so, the mobile device 202 will determine if it is able to achieve the throughput exceeding a predetermined threshold for a 5G mmWave bearer. If the mobile device is not meeting that threshold, the mobile device 202 will stop measuring mmWave and it will report to the network that it cannot detect any mmWave bearer. This may be done, for example, by communicating an updated UE capabilities message that omits the mmWave bearer.

This updated UE capabilities message will cause the network to tell the mobile device 202 to attach to another bearer, either 5G or LTE. Thus the mobile device is able to save power by moving off of the relatively high energy bearer, mmWave, to a relatively lower energy bearer, 5G or LTE.

In another example, the mobile device 202 is attached to a 5G NR bearer. The user starts to download a large file. During the download, the mobile device 202 will measure the signal to noise ratio (SNR) or noise that is currently being experienced by the mobile device 202 during operation of the mobile device 202. If the mobile device 202 finds that the noise is high over a period of time, for example, exceeding a noise threshold over a time period that exceeds a temporal threshold, the mobile device 202 will stop measuring 5G NR, and report to the network that it does not detect any 5G NR barer. This will cause the network to move the mobile device 202 to an LTE bearer.

Manufacturers of mobile devices such as mobile device 202 continue to experiment with different ways to determine if the device is getting benefit from being on a 5G bearer, with the idea to only use 5G if the user is getting benefit from being on the higher energy-consumption bearer. However, the mobile device 202 has imperfect information. The assumption behind this tactic is that the bearer that the network will move the mobile device 202 to is equal to or will be better than the bearer that the mobile device 202 is currently on. However, the mobile device 202 has no knowledge that this is actually the case. The network knows the condition of the network, and the network placed the user on what the network determined to be the best bearer that it could, based upon what networks that the mobile device 202 reported that it is detecting. But the mobile device 202 has stopped reporting some networks, even though it is in the presence of them.

If the mobile device 202 is going to make decisions about bearer selection, which has not done before, more information may be provided to the mobile device 202 about the other bearers that the mobile device detects so that the mobile device 202 can make a more informed decision if it should move off of the current bearer. Mobile devices such as mobile device 202 have just started making use of these tactics with the advent of 5G networks. What the mobile devices are doing is within inter-operational standards, but there is nothing in current published standards that addresses this situation. In some cases, in an effort to save power and for the mobile device to appear more reliable to an end user, the mobile device is potentially making the service offered by the network operator look worse by forcing the mobile device onto bearers that provide a bad experience for the end user.

In accordance with various aspects described herein, a network device may communicate with a mobile device to provide to the mobile device information known to the network about other channels available to the mobile device in a cell. The network has the knowledge about all bearers or radio access networks available at a current base station and other base stations in the area. The network knows how many channels are available in a cell. The network knows the SNR of the cell. The network knows how loaded a cell is. The network also knows similar information about the condition of neighboring cells. Based on current trends and historical information, the network can make reliable predictions about any and all of these factors in cells of the network. In embodiments, the network provides a network application programming interface (API) that UE devices such as the mobile device 202 can interact with and receive from the network a network capabilities message including suitable information about network capabilities for the mobile device to make an informed decision to change bearers at a cell.

The network API for access by the mobile device can be provided by any suitable network element of a cellular network. One or more base stations may provide the network API for direct communication with the mobile device. A dedicated network element may provide the network API for the mobile device. In some embodiments, the network element providing the network API, such as a dedicated network element, has access to a wide variety of real time information about current network traffic and radio environments for bearers in each cell of the network. Moreover, in some embodiments, the dedicated network has access to historical information about traffic levels, network availability and other factors that may be useful for predicting bearer availability. Such historical information may be used, in some embodiments, for training a machine learning model or artificial intelligence module that may form a part of the network element. In some embodiments, a secure entitlement server or other server computer, accessible over a network by mobile devices and other equipment of the network, may provide the network API.

Figure 2B:
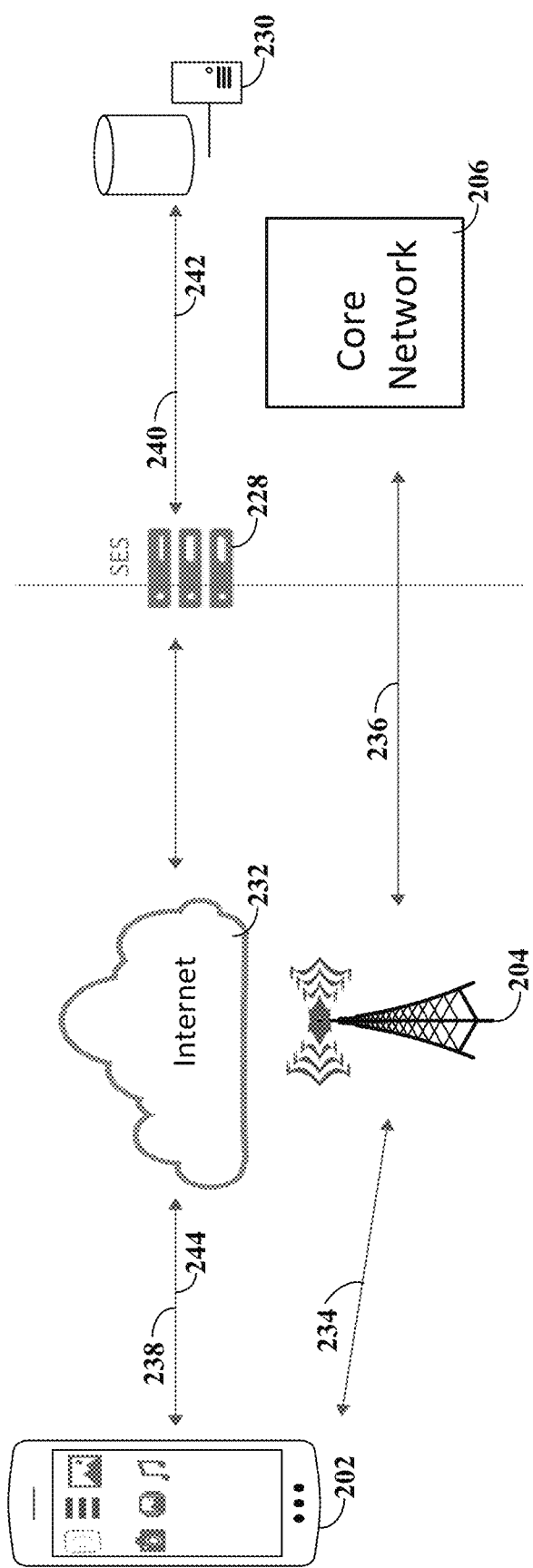
FIG. 2B is a block diagram illustrating an example, non-limiting embodiment of a mobile communication network functioning within the communication network of FIG. 1 in accordance with various aspects described herein.

FIG. 2B is a block diagram illustrating an example, non-limiting embodiment of a mobile communication network 220 functioning within the communication network 125 of FIG. 1 in accordance with various aspects described herein. The exemplary embodiment of the mobile communication network 220 includes a mobile device 202, a base station 204, a core network 206, a secure entitlement server (SES) 228 and a database 230. The database 230 is a business support system (BSS) that stores information about services and network features which the mobile device 202 is authorized to use. The SES 228 may access the database 230 to obtain such information about a particular mobile device such as mobile device 202. The mobile communication network 220 is operated by a network operator.

The mobile device 202 can be implemented as a smart phone or other handheld communication device. The mobile device 202 can access the core network 206 through radio connection with the base station 204. The mobile device 202 can access the SES 228 over any suitable connection including the internet 232. In some embodiments, the mobile device 202 can access the internet 232 through the base station 204, through a Wi-Fi connection using a Wi-Fi radio according to a radio standard such as IEEE 802.11x and a Wi-Fi access point (not shown) in communication with the internet 252.

The core network 206 may include one or more core networks. The core network 206 provides network management functions such as authentication, authorization, accounting, verification. Further, the core network 206 provides or participates in network control functions such as registration of mobile devices accessing the network 220 and management of handover of communication from one base station, such as base station 204, to another base station. The services provided by each network of the core network 206, including the radio access technology supported by each network, may be partitioned or distributed among the one or more core networks in any suitable manner.

The SES 228 forms a service authentication device. The SES 228 provides a means for UE devices such as the mobile device 202 to get information in a secure way on an individual user basis. UE devices such as the mobile device 202 communicate with the SES 228 to determine if the UE devices are allowed to use services such as Wi-fi calling, Hotspot® network service, FaceTime® communication service, and other services. The SES 228 is an out of band or out of network device in that it is not part of the inherent functioning of the mobile communications network 220. The functioning of the mobile communication network 220 occurs independently of the SES 228 but some aspects of the functioning of the mobile communication network 220 may be controlled by the SES 228.

Some mobility network operators have implemented a network element called the secure entitlement server such as SES 228 or other devices to provide similar functionality in the mobility network. The SES 228 handles authentication of devices, services, subscriptions and subscription profiles of users. Further, the SES 228 enables over the air (OTA) configuration of setting of mobile devices such as the mobile device 202. For example, the SES 228 can be used for establishing a subscription to use Wi-Fi calling and Voice Over LTE (VoLTE) calling for the mobile device. Once the service is provisioned on the SES 228, information about the subscription is provided to the mobile device 202 and the mobile device 202 updates its setting to reflect the subscription and enable the service at the mobile device 202.

The SES 228 or other service authentication device may be embodied in any suitable manner. In the example of FIG. 2C, the SES 228 is embodied as a server computer in data communication with a network including the internet. In other embodiments, the SES 228 or other service authentication device may be embodied as hardware or software or any combination of these and located at any suitable location in data communication with UE devices such as the mobile device 202.

The mobile device 202 from time to time authenticates with the SES 228 and enquires about entitled services such as Wi-Fi calling, operation as a hotspot or tethering. The mobile device 202 will not enable any of the entitled services until receiving an indication from the SES 228. In accordance with various aspects described herein, provision of a network capabilities message, including information about radio access networks that may be available to the mobile device 202, may be accomplished making use of the functionality of the SES 228.

The SES 228 generally is accessible by a mobile device for the mobile device to determine permissions or authorizations in the network or to obtain other information. In an example, the mobile device 202 contacts the SES 228 and provides information about the current location of the mobile device 202 and the networks or bearers the mobile device 202 can detect at that location. Other provided information may include relative signal strength of networks, signal to noise ratio and other radio channel data for each respective network. The SES 228 responds with appropriate information to inform the mobile device 202 about its current radio environment. Signaling and data interchange between the SES 228 and mobile devices may be standardized to include a series of messages such as queries and responses. Communications may be secure and encrypted if appropriate.

Any suitable information may be provided in a network capabilities message by the SES 228 to the mobile device 202. In general, the information reported the network capabilities message may include or be based on information collected from other network components of the network 220, including base stations such as base station 204. The SES 228 may establish signaling or messaging with other network components to collect the necessary information, such as number of active cells attached to a network at a cell site. Separately, the information may be retrieved from a common network location of the core network 2060 after reporting to the common network location by the base stations including the base station. The SES 228 may receive raw data and process the data to provide additional data for use by UE devices such as the mobile device 202.

In one example, the network capabilities message includes information about the number of UEs (mobile devices) in radio resource control (RRC) connected per cell site as a percentage of the total allowed UEs in RRC for the cell site. The RRC is a network layer protocol used between UEs such as the mobile device 202 and base stations such as the base station 204. RRC protocol functions include connection establishment and release, broadcast of system information, radio bearer establishment, reconfiguration and release, mobility, and paging. The total allowed UEs in the maximum practical number of UE devices that may attach to the base station for a particular bearer. The number of UEs connected represents the number currently connected. The information provided may include data for all primary cells and secondary cells, where the network is so configured. The information provided may include data for all cells that the UE is reporting it detects. The information provided may cover a period of minutes, giving the UE a picture of what the trend is for this cell site.

In a second example, the network capabilities message includes information about the number of UEs in idle state per cell site as a percentage of the total allowed UEs in RRC for the cell site. Idle state corresponds to a state in which the UE or mobile device 202 is present and awaiting communication but is not engaged in a voice call or a data session. Again, the information provided may include data for all primary cells and secondary cells and the information provided may include data for all cells that the UE is reporting it detects. The information provided may cover a period of minutes to show trend information for the current cell site.

In a third example, the network capabilities message includes information about network congestion or a load indicator. This may be provided as a value of the number of channels that are available versus the total number of channels that are available in that cell site. This information may be provided for period of minutes to give the UE a picture of the load on the site over a period of time.

In a third example, the network capabilities message includes information about average uplink (UL) received signal strength (RSSI) or signal to noise ratio (SNR) on all cells that the UE is reporting seeing over a period of time. Such information would give the UE a more complete picture of the noise that each cell is experiencing. Each UE device has access to its own downlink information including RSSE and SNR for the current cell and other detected cells.

In an embodiment, each UE device may detect its own downlink (DL) information and report its DL to the core network 206. The SES 228 may access the DL information for multiple UE devices and process this DL information and include processed DL information in the network capabilities message. Such information would give the UE an even more complete picture of the noise present in each cell.

In a fourth example, the network capabilities message includes information about total available bandwidth at the cell site. Licensed radio spectrum controlled by the network operator is allocated by the network to mobile devices such as the mobile device 202. A finite, limited amount of spectrum is available. The amount of spectrum currently available, or predicted to be available, may be specified and provided to the UE.

Any information provided to the UE device may be given as an absolute number, as a percentage on in any other format. For example the number of UE devices connected per cell site may be specified as an absolute number, such as 2 or 20 or 200 connected UEs. Alternatively, the number may be specified as a percentage of the maximum number the cell site can handle, such 20 percent or 80 percent of capacity. Providing the percentage number to the mobile device may be more useful for a mobile device to decide to change networks, especially if information about the total capacity is not separately known or provided. Moreover, providing the percentage number to the mobile device may allow the network operator to keep confidential the information about network capacity, which may be important for business purposes. Still further, the percentage value may be based not on total capacity of the cell but on an artificial capacity. For example, if the actual capacity of the cell is 100 UE devices that may be connected to the cell and 20 devices are currently connected to the cell, the network may use an artificial capacity of 80 total devices that may be connected to the cell. The network may then report that the cell is currently at 25 percent of capacity rather than 20 percent of capacity. This allows the network operator to maintain some headroom of additional actual capacity for network operations, such as for adding devices that require handoff to the cell from an adjacent cell. This also allows the network some control over the UE decision to move to the bearer if the bearer is highly congested. The bearer will appear to be more congested than is actually the case, providing a disincentive to moving to the congested bearer.

Information provided to the UE device in the network capabilities message may be given based on historical data or based on a prediction. The network may maintain historical data about parameters of interest to the mobile device 202 that is interested in changing bearers. For example, the network may maintain information about historical usage levels for specified days and time periods. The values may be absolute for a particular time and date, such as 80 percent capacity on Tuesdays at noon. The values may be averaged over some time period to account for variation due to UE devices moving in and out of the cell. For example, a cell that serves a busy stretch of freeway may appear very heavily loaded at a particular instant, but the serviced UE devices are quickly moving in and out of the cell, being handed over to adjacent cells, so the time average loading may appear less than an instantaneous value.

In some embodiments, the network may employ machine learning or artificial intelligence to tailor information given to the UE device in the network capabilities message. For example, historical data about network loading may be used to train an artificial intelligence engine that is located at the SES 228 or elsewhere in the network 220. The artificial intelligence engine may identify a best choice network or bearer among a plurality of available bearers, based on an artificial intelligence model. The output of the artificial intelligence model may be used to weight the information provided in the network capabilities message, such as by multiplying an available capacity percentage by a weighting factor that may be greater than 1, less than 1 or equal to 1. The information of the network capabilities message is preferably tailored to give the UE device reliable information to make a better decision about moving away from a network assignment that may be currently reliable.

In some embodiments, the information provided in the network capabilities message may be based on current activity of the mobile device 202. For example, if the mobile device 202 is engaged in a heavy download of data, the network may apply a weighting factor to adjust the information provided in the network capabilities message to favor or disfavor a decision by the mobile device to move off the current bearer. This is particularly useful if the data of the payload of packets communicated with the mobile device is not encrypted, or if a source or destination of the data is not obscured, such as by routing through a proxy.

In some embodiments, the network may adjust the information provided in the network capabilities message based on information about the mobile device 202 itself. When the mobile device queries the SES 226, the mobile device 202 identifies itself so that, for example, the make and model number of the mobile device, the device capabilities and the user associated with the device are known to the network. This information includes subscription information for the user and the mobile device 202. The subscription information may define what networks the mobile device may access. For example, the user's subscription may not provide access to mmWave 5G cellular service. The network may use the subscription information to deny access to an unauthorized bearer or to weight the information in the network capabilities message to discourage a decision to switch to an unauthorized bearer. Or the network may override the subscription information to temporarily permit the mobile device to switch to an unauthorized bearer to improve the experience for the user who is currently using a congested network and rapidly depleting the battery of the mobile device 202 in the process.

In some examples, the detail of information provided to the mobile device 202 by the SES 226 in a network capabilities message may be related to a subscription level purchased by the user associated with the mobile device 202. For example, a user who subscribes at a higher-level subscription, with more features, may be provided more detailed information about available networks at the cell site. Such a feature may allow the network provider to provide differentiated levels of service to customers and to better manage traffic and loading on the network.

Further, at some selected times, the network operator may disable the SES 228 or particular functional features of the SES 228. For example, because of network loading in one or more networks, the network operator may choose to disable a feature of allowing the mobile device 202 to select its own network. During such times, the SES 228 may disable provision of a network capabilities message in response to a query from a mobile device or may provide a network capabilities message indicating that network selection by mobile devices is currently not allowed. The mobile device 202 may respond by suppressing bearer reselection for a period of time, until advised otherwise by the SES 228.

In an embodiment, the network capabilities message operates to collect this network information and present this information to a UE device or mobile device 202 on demand, in response to a query. In this manner, the UE has better information about the neighboring cells to make the best decision before moving bearers. If the mobile device 202 is going to move bearers, the information in the network capabilities message ensure that the UE or mobile device 202 has access to information about the situation on these other bearers.

FIG. 2B further illustrates operations in an embodiment of a method for device-based network steering. The network 220 includes multiple radio access networks provided as bearers by base station 204. The bearers in an example include 3G cellular, 4G LTE cellular and varieties of 5G cellular, including mmWave, 5G NR, 5G NSA and 5G NSA. Each bearer is available to mobile devices such as the mobile device 202 depending on mobile device characteristics and other factors.

The mobile device 202 operating in the network 220 seeks to change from a current bearer or current radio access network to which the mobile device 202 is attached. The mobile device 202 operates automatically based on its current operating parameters. In an example, the mobile device 202 concludes that current battery drain exceeds a threshold value, and that data throughput does not exceed a threshold value. For example, the mobile device 202 may monitor current data throughput and compare the current data throughput value with a retrieved performance threshold value. The performance threshold value in this example relates to data throughput and may be measured in Mbps. In other examples, other performance parameters and other performance threshold values may be used. Moreover, different performance threshold values may be used for different networks. For example, the mobile device may use a relatively lower data throughput threshold when currently attached to a 4G LTE network and may use a relatively higher data throughput threshold when currently attached to a 5G mmWave bearer. The mobile device 202 may conclude that current battery drain is excessive in any suitable manner. In an example, battery drain is measured and compared with a threshold. In another example, the nature of the radio access network to which the mobile device 202 is attached may identify or define current battery drain. For example, in some applications, a mobile device 202 could use up to 20 percent more power when attached to a 5G mmWave bearer then connected to an LTE bearer. Presence of the mobile device 202 on a 5G mmWave bearer may qualify as high current battery drain.

At step 234, the mobile device 202 registers to the network 220 and communicates to the network 220 the frequency bands and network bearers that the mobile device 202 detects and the relative signal strength of each bearer. Also, the mobile device 202 communicates the type of radio access technology (RAT) such as 3G, LTE, 5G, etc. Step 234 may be initiated by, for example, powering on the mobile device 202 and as a result causing the mobile device 202 to follow a standard network attachment routine. This may be done according to a published air interface standard, for example.

In an example, the base station 204 requests the capabilities of the mobile device 202 at step 236. The request may be sent in a standard message format, for example. The mobile device 202 or user equipment (UE) returns a UE capabilities message. The UE capabilities message may be in a standardized format as well. The UE capabilities message 212 includes information about what network technologies the mobile device can access, such as 3G, 4G and 5G, and frequencies the mobile device 202 is able to use. Data from the UE capabilities message may be used by the network 220 to configure a connection between the mobile device 202 and the network 220.

The base station 204 communicates with the mobile device 202 over one or more radio channels, preferably according to a published air interface standard. The base station 204 further communicates with the core network 206. The base station 204 and the core network 206 may communicate over high-speed data connections such as fiber optic cable. The core network 206 provides connection to other networks such as the public internet. The core network 206 further provides network functions such as authentication, authorization, and accounting.

At step 236, the network 206 communicates to the mobile device 202 through the base station 204 which network the device should attach to and the frequency bands that the mobile device 202 should use for attachment. The network 206 also allocates spectrum to the device. The network 206 may use any available information, including device information about the particular mobile device 202 and network information, for automatically deciding how to connect the mobile device 202 to the network 220. For example, the network 206 receives the UE capabilities message from the mobile device 202 and uses this device information for deciding how to connect the mobile device 202 to the network 220.

Further, the network 220 has network information about the network 220. Network information includes information about bearers available at the base station 204, since not all base stations operated by the network operator may have access to all RAT types. Network information includes information about relative traffic levels or capacity or available capacity on each bearer at the base station 204. In some embodiments, network information includes historical information about the network, such as past capacity and usage levels, and historical information about the particular base station 204. In some embodiments, the network information available to the network 206 includes predictive information about future traffic levels including abnormal situations such as a spike in traffic due to an event such as a sporting event in the vicinity of the base station 204, as well as planned system outages for maintenance or other reasons. In some embodiments, the system may include an artificial intelligence module that implements an artificial intelligence routine or machine learning routine to predict future network conditions.

As part of the process of attaching to the network 220, the mobile device 202 may contact the SES 228 and the database 230. The SES 228 handles authentication of devices, services, subscriptions and subscription profiles of users. The SES 228 responds to information about the subscription provisioned for the mobile device 202 and the user associated with the mobile device 202. Further, the SES 228 may enable over the air (OTA) configuration of setting of mobile devices such as the mobile device 202. For example, the SES 228 can be used for establishing a subscription to use Wi-Fi calling and Voice Over LTE (VoLTE) calling for the mobile device. Once the service is provisioned on the SES 228, information about the subscription is provided to the mobile device 202 and the mobile device 202 updates its settings to reflect the subscription and enable the service at the mobile device 202.

The SES 228 or other service authentication device may be embodied in any suitable manner. In the example of FIG. 2B, the SES 228 is embodied as a server computer in data communication with a network including the internet 232. In other embodiments, the SES 228 or other service authentication device may be embodied as hardware or software or any combination of these and located at any suitable location in data communication with UE devices such as the mobile device 202.

The database 230 is a business support system (BSS) that stores information about services and network features which the mobile device 202 is authorized to use. The SES 228 may access the database 230 to obtain such information about a particular mobile device such as mobile device 202.

The mobile device 202 from time to time authenticates with the SES 228 over the internet 232 and enquires about entitled services such as Wi-Fi calling, operation as a hotspot or tethering. The mobile device 202 will not enable any of the entitled services until receiving an indication from the SES 228. In accordance with various aspects described herein, dynamic provisioning of bearer access may be accomplished making use of the functionality of the SES 228 and the database 230.

Following network attachment by the mobile device 202, the mobile device 202 operates on the network 220. Operation includes monitoring the radio frequency (RF) environment of the mobile device, including detecting other bearers provided by the base station 204 and other base stations of the network 220. During operation, the mobile device 202 continuously or from time-to-time measures one or more performance parameters that describe the operation of the mobile device 202 on the bearer that it was assigned. Such process may be implemented as a software routine in a processing system of the mobile device 202 using hardware resources of the mobile device 202. Such performance parameters may include any suitable information about device performance such as data throughput, latency, and others. The mobile device 202 may compare one or more performance parameters with one or more performance threshold to evaluate performance on the network 220. The mobile device 202 may determine that the assigned bearer is not meeting the performance threshold of data throughput or other performance parameter.

Based on the evaluation of performance on the mobile communication network 220, the mobile device 202 may automatically decide to select another bearer for future communication. In a particular example, the mobile device 202 is operating on a 5G cellular bearer and such 5G operation consumes relatively more battery power at the mobile device 202 compared to other bearers.

In response to a conclusion by the mobile device that the mobile device 202 should change bearers, at step 238, the mobile device 202 makes an API call to get information about the other bearers that it detects. The API call may specify that the mobile device 202 is seeking to change bearers and the network 206, including the SES 228, may respond accordingly. For example, the network 206 seeks to provide to the mobile device 202 suitable information to inform the mobile device 202 about other possible bearers so that the mobile device 202 can make the best decision about changing bearers.

In an embodiment, the mobile device 202 contacts the SES 228 over the internet 232. The SES 228 provides an application programming interface including defined messaging for receiving inquiries from the mobile device 202 and providing responses in return. In an example, the mobile device 202, operating through a software routine of the mobile device 202, requests from the SES 228 or other element of the core network 20, congestion information about the other bearers. The network 206 responds with suitable information. In the example, the SES 228 queries the database 230, step 240, and receives information about the capabilities and subscription profile of the mobile device 202 from the database 230, step 242. The SES 228 may respond to the received enquiry from the mobile device and the information from the database 230 by reporting information about other available bearers to the mobile device, step 244. In the example, the response from the network 206 or the SES 228 indicates that an LTE bearer at the base station 204 is not congested.

The mobile device 202 initiates a bearer change process. The bearer change process includes providing information to the network 206 or the SES 228 to cause the network 206 to reassign the mobile device 202 to the desired network. In the example, the desired network is the LTE bearer of the base station 204. In an embodiment, the mobile device 202 uses the UE capabilities message or UE capabilities matrix of the mobile device to request or force the bearer change. The UE capabilities message includes information about the radio access technology the mobile device 202 can use. For example, the mobile device 202 may include radio circuits and software to access 3G cellular and 4G LTE cellular, but not 5G cellular. In another example, the mobile device 202 will change the information about bearers that the mobile device 202 can currently detect. Even though the mobile device 202 can detect a 5G bearer, for example, the mobile device 202 will indicate that the mobile device 202 cannot detect this 5G bearer. This information is indicated in the UE capabilities message. In another example, the mobile device 202 may include radio circuits and software to access 3G, 4G LTE and 5G NR, but not 5G mmWave or 5G NSA.

In the example, to initiate the bearer change, a routine operating on the mobile device 202 changes the data of its UE capabilities matrix and communicates the changed data in a UE capabilities message to the network 206 through the base station 204. In the example where the mobile device 202 has been operating on a 5G bearer, but with unsatisfactory data throughput, the mobile device 202 removes 5G capability from its UE capabilities matrix and reports the updated UE capability information to the network 206. The mobile device 202 in effect reports to the network that it cannot see the 5G bearer that it is on.

The network 206 receives the updated UE capabilities information indicating that the mobile device 202 cannot detect the 5G bearer. Responsive to the updated UE capabilities information, the network 206 responds with a message indicating that the mobile device should reattach to the network using the LTE bearer at the base station 204. Based on this message, the mobile device 202 attaches to the LTE bearer and operation continues normally.

While for purposes of simplicity of explanation, the respective processes are shown and described as a series of steps in FIG. 2B, it is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200 presented in FIGS. 1, 2A, 2B, 2C, and 3. For example, virtualized communication network 300 can facilitate in whole or in part assigning a mobile device to an initial radio access network based on radio access networks detected by the mobile device and network information about the radio access networks, receiving from the mobile device a request for information about available traffic capacity on other radio access networks, communicating to the mobile device traffic congestion information for the other radio access networks, and receiving from the mobile device a request to change to a selected alternative radio access network of the other radio access networks to obtain better communication performance at the mobile device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
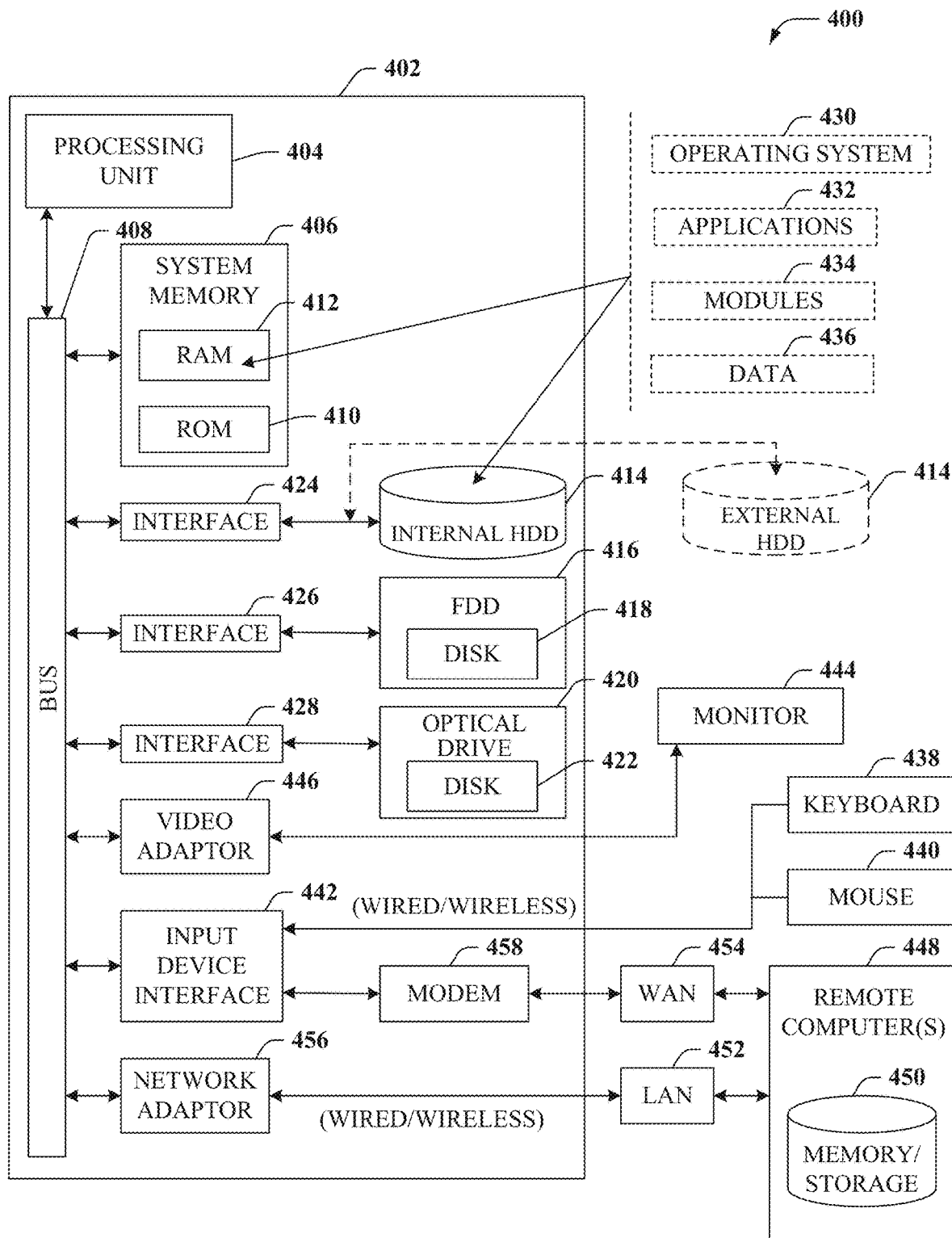
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part assigning a mobile device to an initial radio access network based on radio access networks detected by the mobile device and network information about the radio access networks, receiving from the mobile device a request for information about available traffic capacity on other radio access networks, communicating to the mobile device traffic congestion information for the other radio access networks, and receiving from the mobile device a request to change to a selected alternative radio access network of the other radio access networks to obtain better communication performance at the mobile device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples' system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
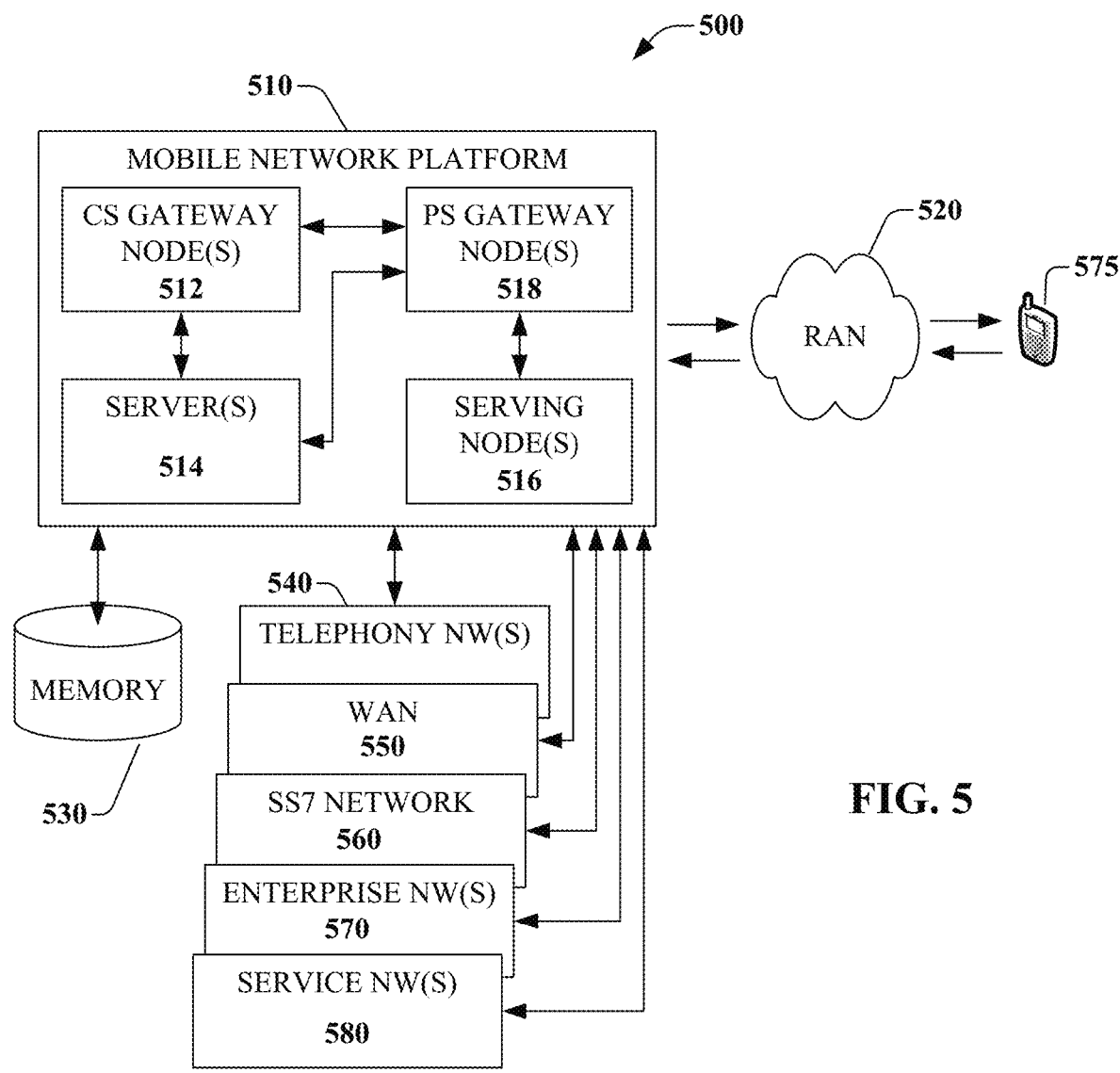
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part assigning a mobile device to an initial radio access network based on radio access networks detected by the mobile device and network information about the radio access networks, receiving from the mobile device a request for information about available traffic capacity on other radio access networks, communicating to the mobile device traffic congestion information for the other radio access networks, and receiving from the mobile device a request to change to a selected alternative radio access network of the other radio access networks to obtain better communication performance at the mobile device. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
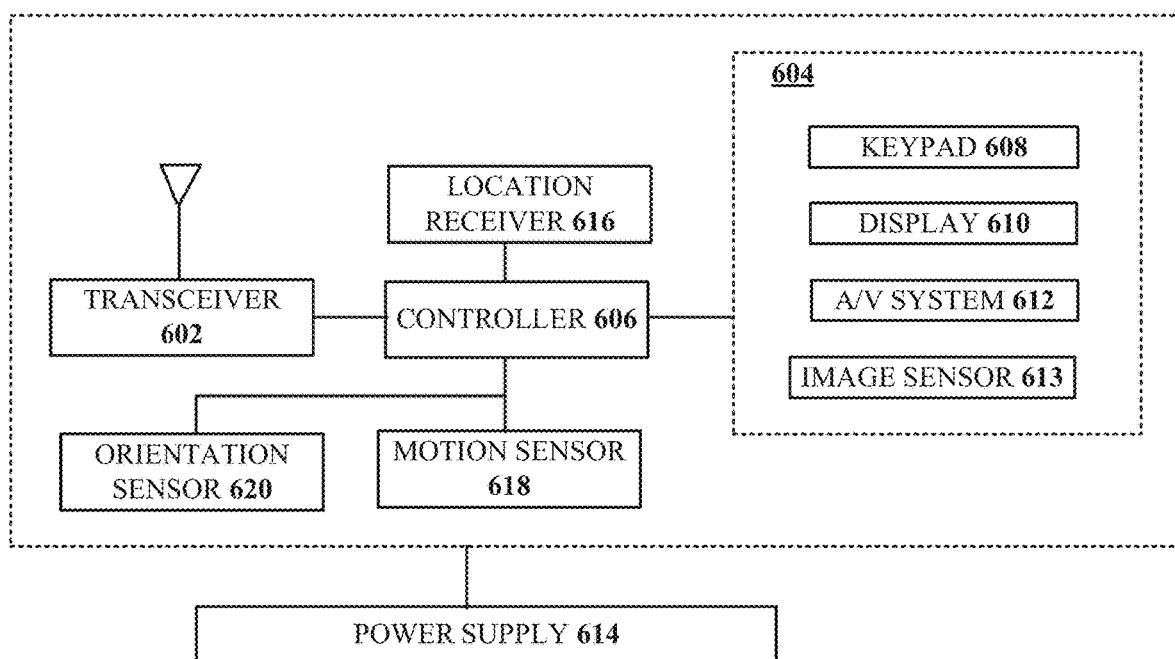
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part assigning a mobile device to an initial radio access network based on radio access networks detected by the mobile device and network information about the radio access networks, receiving from the mobile device a request for information about available traffic capacity on other radio access networks, communicating to the mobile device traffic congestion information for the other radio access networks, and receiving from the mobile device a request to change to a selected alternative radio access network of the other radio access networks to obtain better communication performance at the mobile device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi_33, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile device," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
receiving, by a processing system including a processor, from a user equipment (UE) device, a registration communication requesting registration by the UE device on a mobility network;
communicating, by the processing system, to the UE device, a network assignment, the network assignment selected based on information of the registration communication and network usage information of the mobility network, the network assignment identifying an initial bearer for attachment by the UE device;
initiating, by the processing system, communication with the UE device on the initial bearer at a base station of the mobility network;
receiving, by the processing system, from the UE device, a bearer change communication requesting a change of bearer;
communicating, by the processing system, to the UE device, usage information for alternative bearers at the base station of the mobility network;
receiving, by the processing system, from the UE device, a UE capabilities message identifying a selected alternative bearer;
assigning, by the processing system, the UE device to the selected alternative bearer;
communicating, by the processing system, to the UE device, a bearer assignment message identifying the selected alternative bearer; and
initiating, by the processing system, communication with the UE device on the selected alternative bearer at the base station of the mobility network.

2. The method of claim 1, comprising:
receiving, by the processing system, the bearer change communication requesting a change of bearer responsive to a determination at the UE device that data throughput at the UE device on the initial bearer does not satisfy a predetermined threshold; and
providing, by the processing system, the usage information for alternative bearers at the base station of the mobility network to assist the UE device in selecting an alternative bearer to improve performance at the UE device.

3. The method of claim 1, wherein the receiving the bearer change communication is responsive to a determination at the UE device that data throughput at the UE device on the initial bearer does not satisfy a predetermined threshold.

4. The method of claim 1, wherein the receiving the bearer change communication is responsive to a determination at the UE device that a performance parameter at the UE device operating on the initial bearer does not satisfy a predetermined performance threshold.

5. The method of claim 1, wherein the receiving a registration communication comprises:
receiving, by the processing system, an initial UE capabilities message, the initial UE capabilities message indicating the UE device is capable of communication on fifth generation (5G) cellular systems and fourth generation long-term evolution (4G LTE) cellular systems, and further comprising assigning the UE device to a 5G mmWave cellular bearer as the initial bearer.

6. The method of claim 5, wherein the receiving, from the UE device, a bearer change communication comprises:
receiving, by the processing system, from the UE device, bearer information about detected bearers detected by the UE device at the base station of the mobility network.

7. The method of claim 6, wherein the receiving, from the UE device, a bearer change communication comprises:
receiving, by the processing system, from the UE device, a request for information about communication traffic congestion on detected bearers at the base station detected by the UE device.

8. The method of claim 7, wherein communicating, to the UE device, usage information for alternative bearers at the base station of the mobility network comprises:

communicating, by the processing system, information about traffic capacity on the alternative bearers, wherein the alternative bearers are selected based on the bearer information about detected bearers detected by the UE device.

9. The method of claim 8, wherein the receiving, from the UE device, a UE capabilities message comprises:

receiving, by the processing system, a UE capabilities message that identifies the selected alternative bearer and omits the initial bearer to force the processing system to reassign the UE device to a bearer other than the initial bearer.

10. A mobile device, comprising:

a processing system including a processor; and a memory that stores executable instructions that, when executed by the processing system, facilitate performance of operations, the operations comprising:

attaching to an initial bearer at a base station of a mobility network;

monitoring a performance parameter for communication on the initial bearer;

requesting information about other bearers at the base station of the mobility network, wherein the requesting is responsive to the performance parameter failing to exceed a predetermined performance threshold;

receiving network information about other bearers at the base station of the mobility network, the network information including current capacity information for the other bearers;

selecting a selected alternative bearer based on the information about other bearers; and communicating, to the mobility network, a user equipment (UE) capabilities message identifying the selected alternative bearer and omitting the initial bearer to change bearers to obtain better communication performance at the mobile device.

11. The mobile device of claim 10, wherein the receiving network information about other bearers at the base station of the mobility network comprises receiving information about available capacity for the other bearers at the base station of the mobility network to assist the mobile device in selecting an alternative bearer to improve communication performance at the mobile device.

12. The mobile device of claim 10, wherein the monitoring a performance parameter for communication on the initial bearer comprises:

monitoring data throughput at the mobile device.

13. The mobile device of claim 10, wherein the operations further comprise:

identifying a plurality of bearers detected by the mobile device;

measuring respective relative signal strength values for respective bearers of the plurality of bearers; and registering with the mobility network, including communicating an initial UE capabilities message to the base station of the mobility network and further comprising communicating identification information for the respective bearers and the respective relative signal strength values for the respective bearers.

14. The mobile device of claim 13, wherein the communicating identification information for the respective bearers and the respective relative signal strength values for the respective bearers comprises communicating information for a fifth generation (5G) cellular bearer, and wherein the selecting a selected alternative bearer comprises selecting a fourth-generation long-term evolution (4G LTE) bearer as the selected alternative bearer.

15. The mobile device of claim 10, wherein the selecting a selected alternative bearer comprises:

selecting as the selected alternative bearer a relatively lower energy bearer than the initial bearer to reduce power consumption of the mobile device while maintaining a data throughput value that exceeds a predetermined data throughput threshold for the relatively lower energy bearer.

16. A non-transitory machine-readable medium, comprising executable instructions that, when executed by a processing system including a processor, facilitate performance of operations, the operations comprising:

registering a mobile device with a mobility network at a base station, the base station supporting a plurality of radio access networks of different technologies;

receiving information about radio access networks detected by the mobile device;

assigning the mobile device to an initial radio access network, wherein the assigning is based on the information about radio access networks detected by the mobile device and network information about the radio access networks detected by the mobile device;

receiving from the mobile device a request for information about available traffic capacity on other radio access networks of the radio access networks detected by the mobile device;

communicating, to the mobile device, traffic congestion information for the other radio access networks;

receiving from the mobile device a request to change to a selected alternative radio access network of the other radio access networks; and initiating communication between the base station and the mobile device on the selected alternative radio access network.

17. The non-transitory machine-readable medium of claim 16, wherein the receiving from the mobile device a request to change to a selected alternative radio access network comprises:

receiving a user equipment (UE) capabilities matrix from the mobile device, the UE capabilities matrix including the selected alternative radio access network and omitting the initial radio access network.

18. The non-transitory machine-readable medium of claim 17, wherein the operations further comprise:

communicating to the mobile device a message to cause the mobile device to register on the selected alternative radio access network at the base station.

19. The non-transitory machine-readable medium of claim 16, wherein the receiving from the mobile device a request for information about available traffic capacity on other radio access networks comprises:

receiving, at an entitlement server, an application programming interface (API) message requesting the information about available traffic capacity on other radio access networks; and communicating, from the entitlement server, an API message including the traffic congestion information for the other radio access networks.

20. The non-transitory machine-readable medium of claim 19, wherein the operations further comprise:

verifying, by the entitlement server, subscription information associated with the mobile device; and removing, by the entitlement server, information about unsubscribed networks from the traffic congestion information for the other radio access networks, wherein the information about unsubscribed networks is determined based on the subscription information associated with the mobile device.

* * * * *